No. 640,830. Patented Jan. 9, 1900.
F. M. SWAYZE.
CHANGEABLE GEAR FOR BICYCLES.
(Application filed Mar. 21, 1899.)
(No Model.) 2 Sheets—Sheet 1.
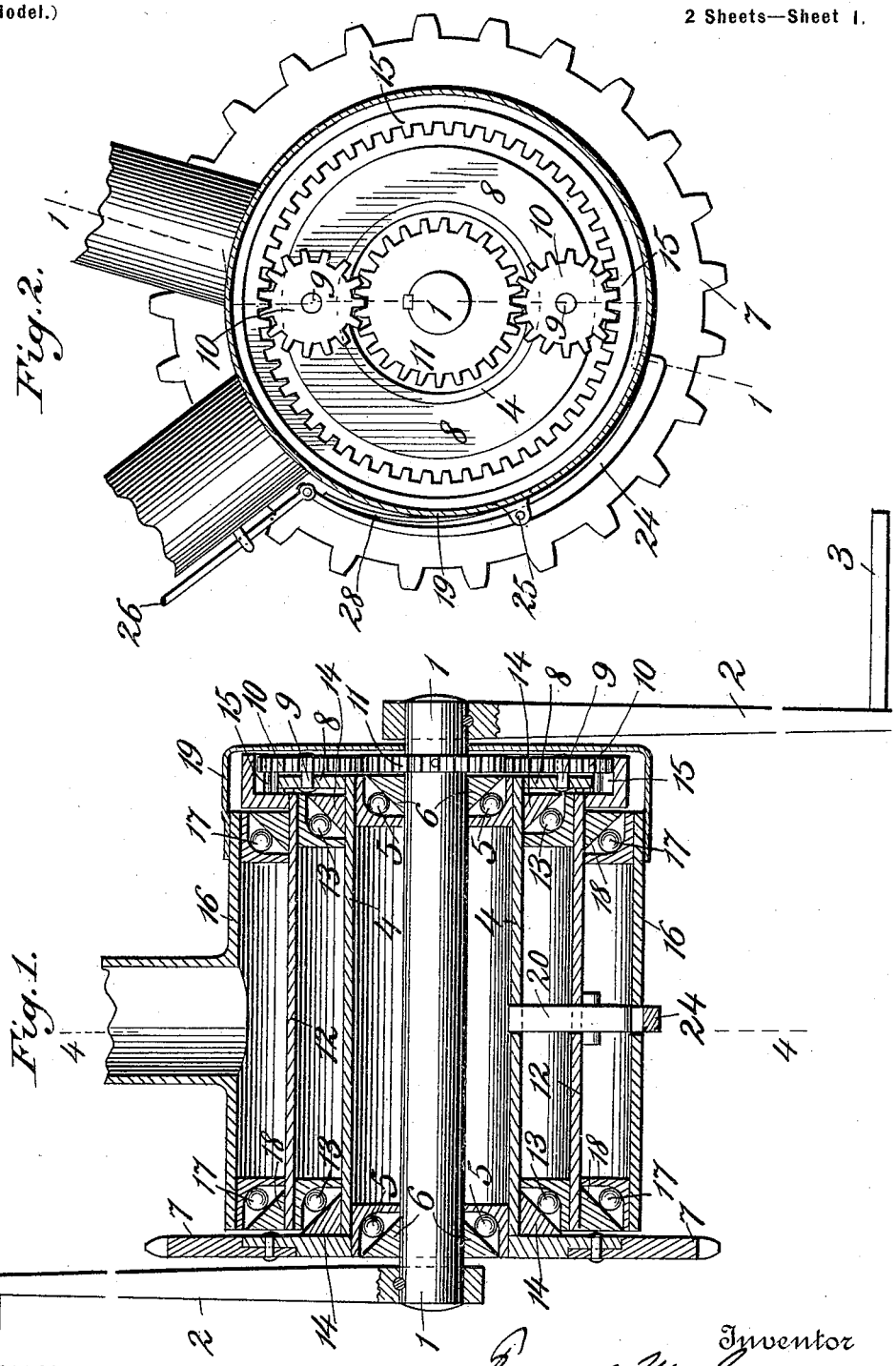
Witnesses
F. H. Schott
M. M. Merrill
Inventor
Frank M. Swayze
By
Attorney

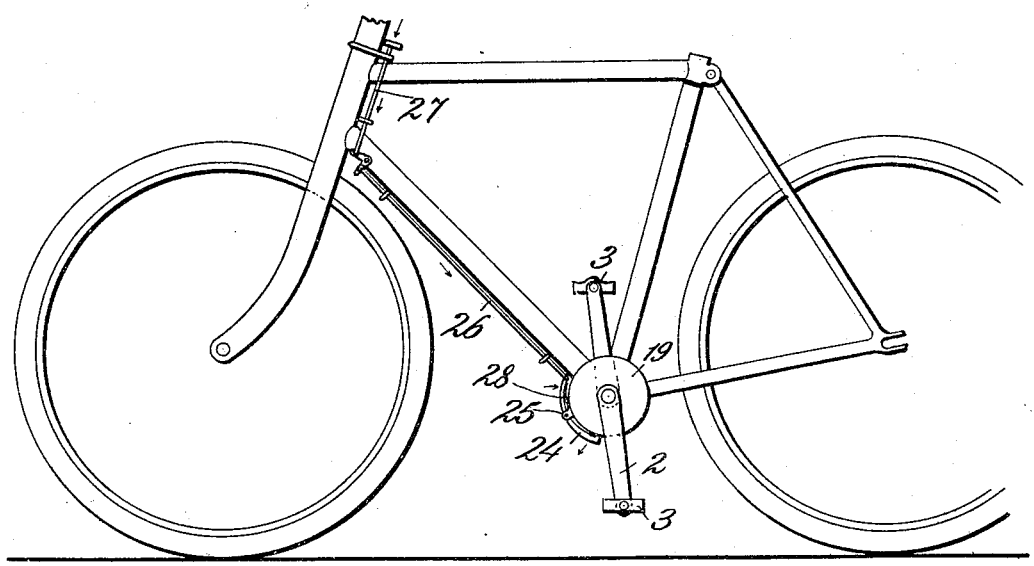
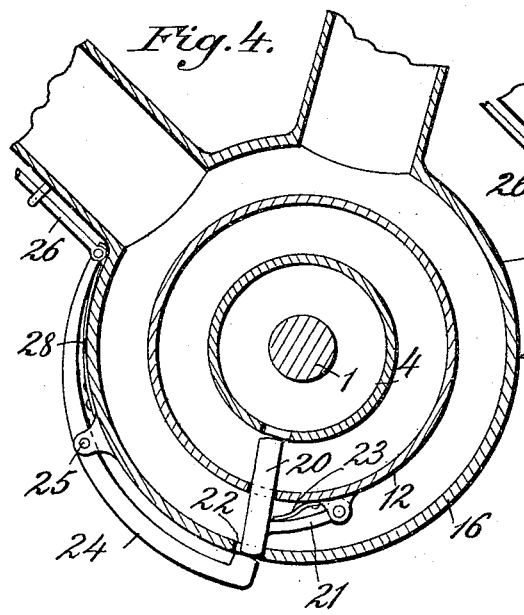
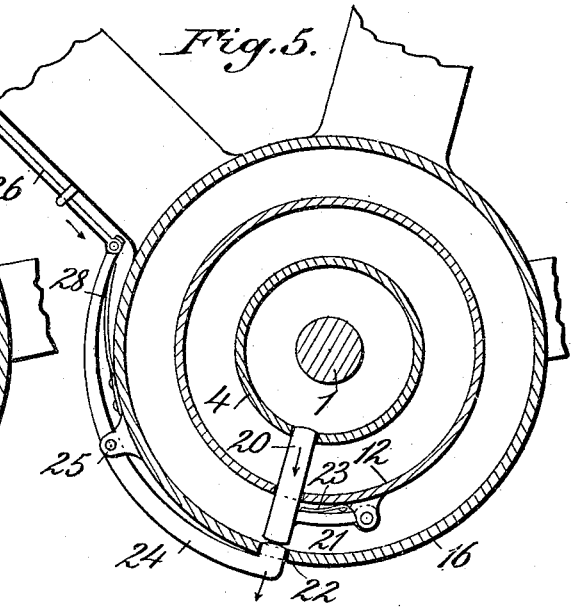

UNITED STATES PATENT OFFICE.

FRANK M. SWAYZE, OF ST. DAVID'S, CANADA.

CHANGEABLE GEAR FOR BICYCLES.

SPECIFICATION forming part of Letters Patent No. 640,830, dated January 9, 1900.

Application filed March 21, 1899. Serial No. 709,959. (No model.)

*To all whom it may concern:*

Be it known that I, FRANK M. SWAYZE, a citizen of Canada, residing at St. David's, in the county of Lincoln and Province of Ontario, Canada, have invented certain new and useful Improvements in Changeable Gear for Bicycles, of which the following is a specification.

My invention relates to improvements in change-speed gearing for bicycles, and has for its object to provide a simple and efficient construction in which the change from high to low speed, or vice versa, can be quickly and readily made without dismounting from the wheel.

The invention consists in the construction and combination of parts hereinafter particularly described and then sought to be specifically defined by the claims, reference being had to the accompanying drawings, forming part hereof, and in which—

Figure 1 is a longitudinal section of a bicycle crank-hanger. Fig. 2 is a right-hand elevation of hanger with gear-wheels shown in section, Fig. 1, exposed. Fig. 3 is a side elevation of bicycle, showing hanger and levers in position. Figs. 4 and 5 are cross-sections of hanger, showing bolt to lock sleeves.

In the drawings the numeral 1 designates the ordinary crank-shaft, having the cranks 2 and pedals 3. Encircling the shaft 1 is a sleeve 4, between which and the shaft at both ends are the balls 5 and their bearings 6, so that the sleeve may revolve around the shaft or ball-bearings. The rotatable sleeve 4 has secured to one of its ends the sprocket-wheel 7 and at the opposite end has secured to it the ring 8, to which are journaled on pins 9 and at points opposite to each other the planetary toothed wheels 10, which mesh with the teeth of the central wheel 11, that is keyed to the crank-shaft 1.

Encircling the sleeve 4 is a sleeve 12, rotatable around sleeve 4, and between which sleeves are the balls 13 and their bearings 14, so that a ball-bearing is afforded for the sleeve 12. The sleeve 12 at one end carries an internally-toothed wheel 15, with whose teeth the teeth of the planetary wheels 10 intermesh.

The numeral 16 designates the crank-hanger, within which are located the sleeves 4 and 12, balls 17 and their bearings 18 being located between the hanger and sleeve 12, so that ball-bearings are on both sides of the sleeve 12 at both of its ends. A cap 19 is provided at the end where the central and planetary wheels and internally-toothed wheel are located, so as to incase the same.

The numeral 20 designates a bolt which is pivoted by its shank 21 to the outer face of the sleeve 12, the bolt itself passing through the sleeve 12 and into the sleeve 4, so as to lock said two sleeves together, and when such is the case the power is transmitted from the crank-shaft practically direct to the sprocket-wheel 7, as when the two sleeves 4 and 12 are locked together the toothed wheels are held against independent movement, and the action is then the same as if the sprocket-wheels were keyed directly to the crank-shaft, and when the sleeves are thus locked together a high-speed gear is obtained.

When a low-speed gear is wanted, the sleeves 4 and 12 are unlocked from each other and the sleeve 12 locked to the crank-hanger by withdrawal of the bolt 20 from the sleeve 4 and the entrance of its rear end into an opening 22, formed in the crank-hanger. When the parts are thus adjusted, power is transmitted from the crank-shaft through the central wheel to the planetary wheels 10, so as to rotate the sleeve 4 and through it impart the power to the sprocket-wheel. This transmission of power through the central and planetary wheels, the latter traveling around the now-fixed internal gear-wheel 15, gives a low-speed gear.

The bolt 20 is under the influence of a spring 23, which tends to normally press the bolt outwardly, so that when the bolt is not pressed inwardly the spring will force it outwardly, so that the bolt will enter the opening provided therefor in the crank-hanger. When a high-speed gear is wanted, the bolt 20 is forced from the hole in the crank-hanger by a lever-finger 24, pivoted to the hanger at 25 and having its arm connected by a crank-rod 26 to an operating-lever 27, located adjacent to the handle-bars, so as to be within easy reach of the bicycle-rider. This lever-finger may be under the influence of a spring 28, which will press it in one direction, while the operating-lever will press it in the opposite direction.

When the locking-pin 20 is pushed in to lock the sleeves 4 and 12 together, the pin is held in such position after passing from the head of lever 24 by the inner wall of the crank-hanger, against which the outer end of the pin will bear and be pressed by the spring 23, as will be obvious from an inspection of Figs. 4 and 5 of the drawings, and this will be so as long as the head of the lever 24 is kept pressed inward.

I have illustrated and described what I consider to be the best form of the invention; but it is obvious that changes can be made in the details without departing from the essential features of the invention.

Having described my invention and set forth its merits, what I claim is—

1. In a bicycle, the combination with the crank-hanger and the crank-shaft, of the central wheel secured to the crank-shaft, the sleeve encircling the crank-shaft and provided at one end with the sprocket-wheel and carrying at the other end the planetary wheels meshing with the central wheel, the sleeve encircling said sprocket-sleeve and provided with an internally-toothed wheel with whose teeth the planetary wheels mesh, and means for locking the sleeve which carries the internally-toothed wheel to either the sprocket-sleeve or to the crank-hanger in changing from one speed to the other, substantially as described.

2. In a bicycle, the combination with the crank-hanger and the crank-shaft, of the central wheel secured to the crank-shaft, the sleeve encircling the crank-shaft and provided at one end with the sprocket-wheel and carrying planetary wheels at its opposite end, said planetary wheels meshing with the central wheel, the sleeve encircling the sprocket-sleeve and provided with the internally-toothed wheel with whose teeth the planetary wheels mesh, ball-bearings between the crank-shaft and crank-hanger and the intermediate sleeves, the bolt movable through the sleeve carrying the internally-toothed wheel toward and from the sprocket-sleeve and the crank-hanger and adapted to engage with one or the other of said parts in changing from one speed to the other, and means for actuating said bolt, substantially as described.

In testimony whereof I affix my signature in presence of two witnesses.

FRANK M. SWAYZE.

Witnesses:
HERBERT G. CLEMENT,
J. B. DALBY.